United States Patent

[11] 3,537,502

[72] Inventor   Vincenzo Napolitano
                2 Via Torino, Milan, Italy
[21] Appl. No.  688,577
[22] Filed      Dec. 6, 1967
[45] Patented   Nov. 3, 1970
[32] Priority   June 28, 1967
[33]            Italy
[31]            17,790 A/67

[54] MACHINE FOR RASPING AND CLEANING OF PNEUMATIC TIRES
     8 Claims, 4 Drawing Figs.
[52] U.S. Cl. .................................................. 157/13
[51] Int. Cl. ................................................. B29h 21/08
[50] Field of Search ..................................... 157/13

[56]              References Cited
           UNITED STATES PATENTS
2,965,162  12/1960   Hawkinson ................... 157/13
2,979,123   4/1961   Frohlich et al. ............... 157/13

Primary Examiner—Granville Y. Custer, Jr.
Attorney—Michael S. Striker

ABSTRACT: A machine for rasping and cleaning of pneumatic tires, which comprises two oscillatably supported rasping units, each provided with motor means and rasping means, and positioned for raspingly contacting the tire to be processed, at diametrally opposite locations thereof. The machine is further provided with adjusting means for adjusting the relative position of the units and of the tire, for processing of tires having different diameters.

Patented Nov. 3, 1970

INVENTOR.
VINCENZO NAPOLITANO
BY Michael S. Striker

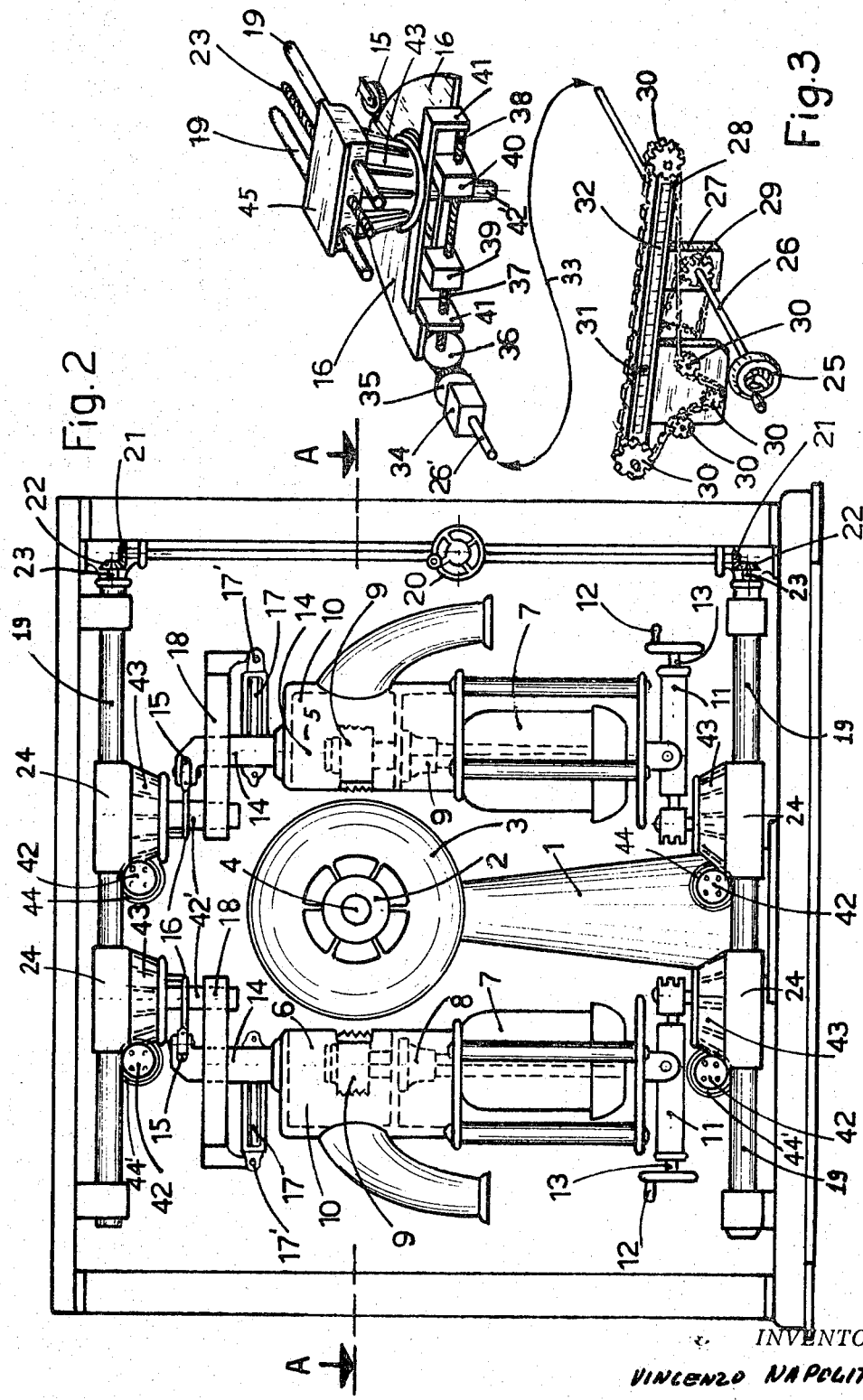

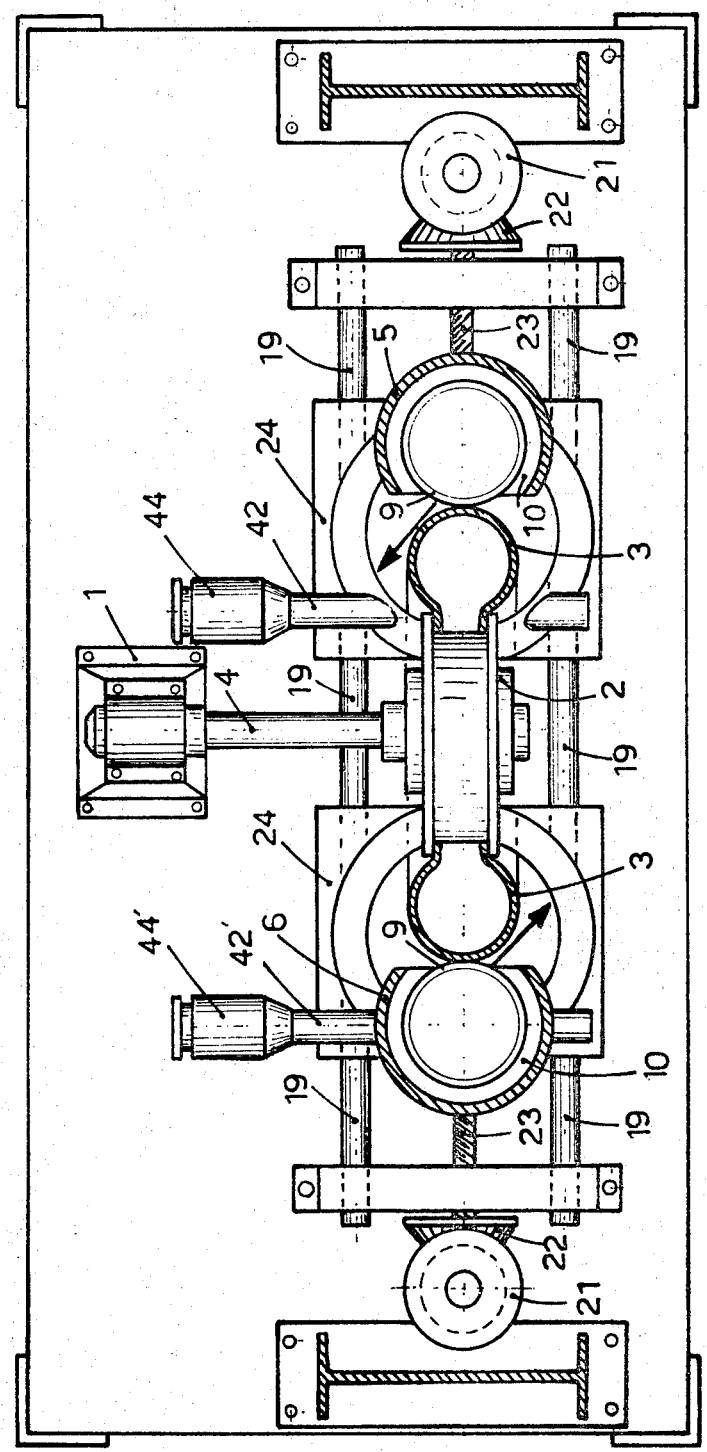

3,537,502

MACHINE FOR RASPING AND CLEANING OF PNEUMATIC TIRES

BACKGROUND OF THE INVENTION

This invention relates to an improved machine for the rasping and cleaning of pneumatic tires.

It is well known that such operations are carried out before the recapping of worn pneumatic tires, for which they constitute an indispensable precondition.

The machine according to the present invention constitutes an improvement over what is known in the art. It is provided with a pair of rasping groups so arranged as to simultaneously accomplish cleaning and rasping of surface portions of a tire at diametrally opposite locations of the tire. The rasps or cutters of the rasping groups may perform part-circular oscillatory movements about vertical pivots, and at the same time describe a reciprocating motion transversely to the axes of these pivots.

SUMMARY OF THE INVENTION

Briefly stated, the invention relates to a machine for cleaning and rasping vehicle tires which, in accordance with the invention, comprises a supporting spindle for vehicle tires, which spindle is rotatable about a horizontal axis. A pair of rasping groups are disposed at opposite sides of the spindle and are mounted for rotary movement in identical direction as well as for alternating oscillatory movement about respective upright shafts which extend transverse to the horizontal axis of the spindle. Mounting means mount the rasping groups for movement toward and away from the spindle. A roller is provided at the upper end of each shaft and cooperates with a variable-profile cam arrangement which imparts to the rasping groups their alternating oscillatory movements about the axes of their respective shafts.

Motion is imparted to the two columns, supporting the respective rasping groups, by motor means which is connected to suitable drive shafts. These each cooperate, at one of their ends, with an endless screw, which engages with a helical reduction gear which is seated in a specially provided casing.

The exact trajectory of the oscillatory motion of the rasping groups is adjusted by means of variable profile cams. A self-centering spindle is provided on an upright column and supports the tires to be processed, and each rasping group can be moved closer to and further from this spindle in direction traversely of the column, so as to enable the machine according to this invention to be used for processing of pneumatic tires of different diameters.

According to another feature of the machine according to the present invention, the rasps of the rasping groups have vertical axes of rotation while the spindle which supports the tires has an axis of rotation which is horizontally oriented.

These and other features of the improved machine according to this invention will be better understood by referring to the accompanying drawing.

BRIEF DESCRIPTION OF THE DRAWING

FIG. 2 represents the improved machine in side view;

FIG. 3 shows a control and adjustment group associated with a variable profile cam which is used in the machine of FIGS. 1 and 2; and FIG. 4 represents a sectional view of the improved machine according to this invention, as seen on line A–A of FIG. 1.

DESCRIPTION OF THE PREFERRED EMBODIMENTS

Figure 1:
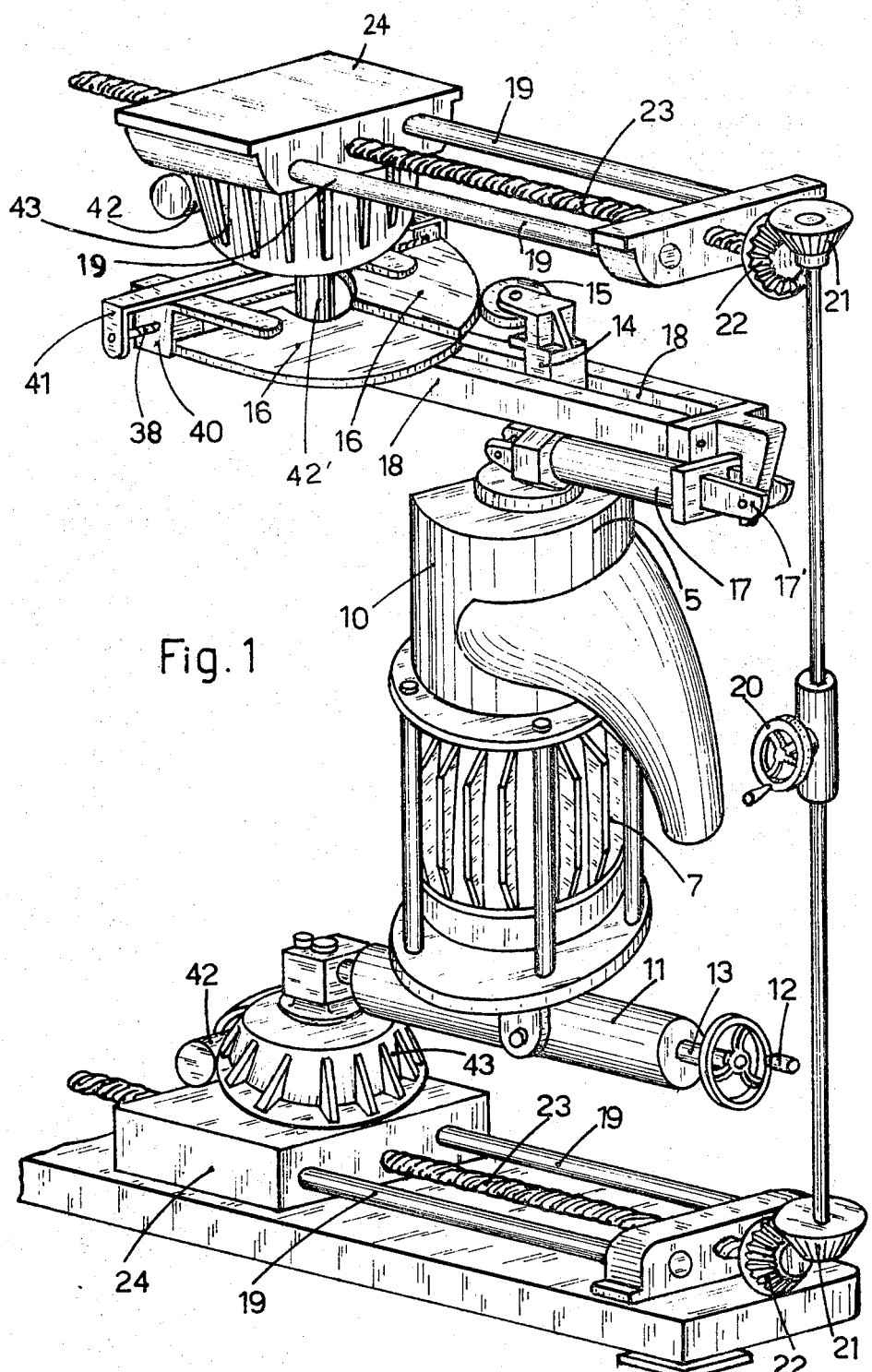
FIG. 1 illustrates in a perspective side view a portion of the improved machine according to this invention, comprising a rasping group, in conjunction with the elements for guiding and adjusting it.

Referring now to the drawing, the improved machine according to this invention comprises a central column 1, which supports a rotary spindle 2, arranged to in turn support a pneumatic tire 3 to be subjected to the rasping and cleaning operations. The spindle 2 is positioned so that it may rotate about a horizontal axis 4.

The machine according to this invention is further provided with two rasping groups 5 and 6, symmetrically disposed on opposite sides relative to the pneumatic tire to be processed. The rasping groups 5 and 6 rotate contemporaneously in the same direction and further describe reciprocating oscillatory motions relative to approximately vertically oriented axes. The rasping groups 5 and 6 each comprise a motor means 7 having a shaft 8 to which there is fitted a rasp 9. The latter is partially protected by a casing 10, which is open at the side facing the tire 3.

Each motor-rasp assembly can be displaced horizontally by actuating a crank 12 which is connected to a screw means 13; the latter causes, when rotated by turning of crank 12, a horizontal displacement of the cap 11 to thereby permit precise adjustments in the position of inclination of rasps 9 with reference to the tire 3.

Each rasping group 5 and 6 is fitted with a support 14, provided at its upper end with a roller 15 which is designed to abut a variable profile cam. Such abutment is guaranteed by the action of a pneumatic piston 17, an end 17' of which is pivoted to a pair of parallel horizontal guides 18 which form a rail. The other end of the piston 17 is connected to the respective rasping group.

The guides 18 are integral with the support pivot 18a of the respective rasping group 5 or 6, and the support 14 is located between each pair of rails 18 so that it may describe a reciprocating rectilinear motion transversely to the upright axis of the respective group and is urged into abutment with the cam 16.

Each rasping group 5 and 6 is further mounted at its upper and lower ends upon pairs of parallel guides 19. The latter serve as guides for a reciprocating rectilinear displacement, which may be described by each rasping group so that the same may be moved towards and away from the respective pneumatic tire to thereby accommodate the apparatus to tires of different sizes. Such motion is simultaneously imparted to each of the two rasping groups by manually actuating a handwheel 20 connected to two shafts which are integral at their opposite ends with two bevel gears 21.

The bevel gears 21 engage with two gears 22 which are each connected with two right- and left-hand screw spindles 23, placed in the center of the parallel guides 19. The screw spindles 23 ensure the axial displacement of two slides 24 which are internally threaded and mounted on the screws 23.

The adjustment of the variable profile of said cams 16 may be effected by actuating a handwheel 25 connected to a shaft 26 which is mounted for rotation in a support 27.

The shaft 26 is integral with a toothed pinion 29 which, when rotated by turning of the shaft 29, advances the chain 28, the latter being trained about a series of pinions 30.

To the chain 28 is fitted a pointer 31 which may slide along a graduated dial member 32. The shaft 26 illustrated in FIG. 3, is integral with and coaxial to, its portion 26' which is shown on the drawing noncoaxial in order to save space. However, the portions 26 and 26' may also be offset relative to one another and connected by an articulated connector 33 as above. The portion 26' of shaft 26 is seated in a recess in the support 34 and is integral with a bevel gear 35. The latter engages with a second bevel gear 36, which is in turn integral with a shaft having threaded portions 37 and 38. It should be noted that the rasping groups 5 and 6 describe a reciprocating oscillatory motion, which is imparted to them by the shafts 42' (see FIG. 4) to which are fitted or with which are made integral the pinions 42, which are in turn in mesh with the helical bevel gears 43, the latter being arranged to rotate about a vertical axis. The shafts 42' are connected to diagrammatically illustrated motors or drive means, e.g. via drive pulleys 44, to receive motion therefrom. It should be stressed here that the reciprocatory and oscillatory motion of both rasping groups is obtained by reversing the supply polarity of the motor means.

I claim:

1. A machine for cleaning and rasping vehicle tires, comprising a supporting spindle for vehicle tires, being rotatable about a horizontal axis; a pair of rasping groups disposed at opposite sides of said spindle and mounted for rotary movement in identical direction, as well as for alternating oscillatory movement about respective upright shafts which extend transverse to said horizontal axis, said rasping groups comprising rasping members on said shafts for contact with tires on said spindle; mounting means mounting said rasping groups for movement towards and away from said spindle transversely to said horizontal axis thereof; a roller mounted on each upright shaft in the region of the upper end thereof; and variable-profile cam means cooperating with each of said rollers and operative for imparting to said rasping groups said oscillatory movement thereof in direction transversely to said horizontal axis.

2. A machine as defined in claim 1, wherein said variable-profile cam means comprises a pair of cam sections shiftable with reference to one another and each provided with a cam track, operating means operative for effecting shifting of said cam sections with reference to one another, and indicating means for providing a visual indication of the relative positions of said cam sections with reference to one another.

3. A machine as defined in claim 1, said rasping groups each including a casing surrounding the respective rasping members and having an opening facing said spindle so as to permit engagement of the respective rasping members with tires on said spindle.

4. A machine as defined in claim 1; and further comprising shifting means operative for shifting said rasping groups in direction of the axes of the respective shafts thereof.

5. A machine as defined in claim 1; further comprising guide rail means in the region of said upper ends of said shafts; and cylinder-and-piston means associated with the respective rasping group and guide rail means for urging said roller into abutment with said variable-profile cam means.

6. A machine as defined in claim 1, said mounting means comprising actuating means associated with both of said rasping groups for simultaneously imparting to both of them movement towards and away from said spindle, respectively.

7. A machine as defined in claim 5, said mounting means comprising additional guide rail means connected to said shafts of said rasping groups extending transversely to said horizontal axis and to said shaft, said additional guide rail means being shiftable towards and away from said spindle transversely to said horizontal axis thereof.

8. A machine as defined in claim 2, said operating means of said variable-profile cam means further comprising a shaft mounted for turning movement, gear means associated with said shaft for effecting shifting of said cam sections in response to turning of said shaft, an endless chain mounted for advancement in a closed path, and connecting means connecting said chain with said shaft for advancement in response to turning of said shaft; and wherein said indicating means comprises elongated dial means and pointer means on said chain and arranged to advance along said dial means in response to advancement of said chain.